(12) United States Patent
Kawai et al.

(10) Patent No.: US 8,916,487 B2
(45) Date of Patent: Dec. 23, 2014

(54) GLASS SUBSTRATE FOR INFORMATION RECORDING MEDIUM

(75) Inventors: Hideki Kawai, Kobe (JP); Hiroshi Kajita, Osaka (JP); Akio Oogaki, Amagasaki (JP); Toshiharu Mori, Settsu (JP)

(73) Assignee: Hoya Corporation, Tokyo (JP)

( * ) Notice: Subject to any disclaimer, the term of this patent is extended or adjusted under 35 U.S.C. 154(b) by 24 days.

(21) Appl. No.: 13/806,988

(22) PCT Filed: Jun. 21, 2011

(86) PCT No.: PCT/JP2011/003548
§ 371 (c)(1),
(2), (4) Date: Dec. 26, 2012

(87) PCT Pub. No.: WO2012/001914
PCT Pub. Date: Jan. 5, 2012

(65) Prior Publication Data
US 2013/0231236 A1 Sep. 5, 2013

(30) Foreign Application Priority Data

Jun. 30, 2010 (JP) ................................. 2010-148571

(51) Int. Cl.
| | | |
|---|---|---|
| C03C 3/087 | (2006.01) | |
| C03C 3/091 | (2006.01) | |
| C03C 3/093 | (2006.01) | |
| G11B 5/73 | (2006.01) | |
| G11B 7/2531 | (2013.01) | |
| C03C 3/097 | (2006.01) | |

(52) U.S. Cl.
CPC .............. *C03C 3/097* (2013.01); *G11B 5/7315* (2013.01); *G11B 7/2531* (2013.01)
USPC .................................. 501/70; 501/66; 501/67

(58) Field of Classification Search
CPC ........ G11B 5/7315; G11B 5/82; C03C 3/087; C03C 3/091; C03C 3/093; C03C 3/095; C03C 3/097
USPC .............................. 501/66, 67, 70; 428/846.9
See application file for complete search history.

(56) References Cited

U.S. PATENT DOCUMENTS

| | | |
|---|---|---|
| 6,162,751 A | 12/2000 | Speit et al. |
| 6,303,528 B1 | 10/2001 | Speit et al. |

(Continued)

FOREIGN PATENT DOCUMENTS

| | | | |
|---|---|---|---|
| JP | 11-314932 | | 11/1999 |
| JP | 2005104774 | * | 4/2005 |
| JP | 2008-198307 | | 8/2008 |
| JP | 4337821 B2 | | 7/2009 |
| WO | WO 2009/116278 A1 | | 9/2009 |

OTHER PUBLICATIONS

International Search Report in PCT/JP2011/003548 dated Aug. 16, 2011, 2 pages.

(Continued)

*Primary Examiner* — Karl Group
(74) *Attorney, Agent, or Firm* — Brinks Gilson & Lione

(57) ABSTRACT

The present invention relates to the glass substrate for an information recording medium comprising the following glass components: $SiO_2$: 52 to 67; $Al_2O_3$: 8 to 20; $B_2O_3$: 0 to 6, with these three oxides FMO: 70 to 85; $Li_2O$: 0.5 to 4; $Na_2O$: 1 to 8; $K_2O$: 0 to 5; and with these three oxides R2O: 5 to 15; MgO: 2 to 9; CaO: 0.1 to 5; BaO: 0 to 3; SrO: 0 to 3; ZnO: 0 to 5; and with these five oxides: 5 to 15; $Y_2O_3$: 0 to 4; $La_2O_3$: 0 to 4; $Gd_2O_3$: 0 to 4; $CeO_2$: 0 to 4; $TiO_2$: 1 to 7; $HfO_2$: 0 to 2; $ZrO_2$: 0 to 5; $Nb_2O_5$: 0.2 to 5; and $Ta_2O_5$: 0 to 5, and satisfies $Li_2O/R2O$: 0.05 to 0.35; $Li_2O/FMO$: 0.005 to 0.035; $Li_2O/(MgO+ZnO)$: less than 2 and $Nb_2O_5/SiO_2$: 0.01 to 0.075.

8 Claims, 1 Drawing Sheet

(56) References Cited

U.S. PATENT DOCUMENTS

| | | | |
|---|---|---|---|
| 7,192,898 B2 * | 3/2007 | Mori et al. | 501/66 |
| 7,396,788 B2 * | 7/2008 | Kawai et al. | 501/66 |
| 7,566,673 B2 | 7/2009 | Kawai | |
| 7,687,419 B2 * | 3/2010 | Kawai | 501/64 |
| 2005/0096210 A1 | 5/2005 | Kawai | |
| 2005/0215414 A1 * | 9/2005 | Kawai | 501/69 |
| 2008/0198510 A1 | 8/2008 | Sugimoto et al. | |
| 2011/0086241 A1 | 4/2011 | Hachitani et al. | |

OTHER PUBLICATIONS

"Magnetic Head Slider Flying Height Control Technique by Micro Thermal Actuator and its Progress," Journal of the Japan Society of Mechanical Engineers, dated Jun. 2008, vol. 111, No. 1075, p. 541.

* cited by examiner

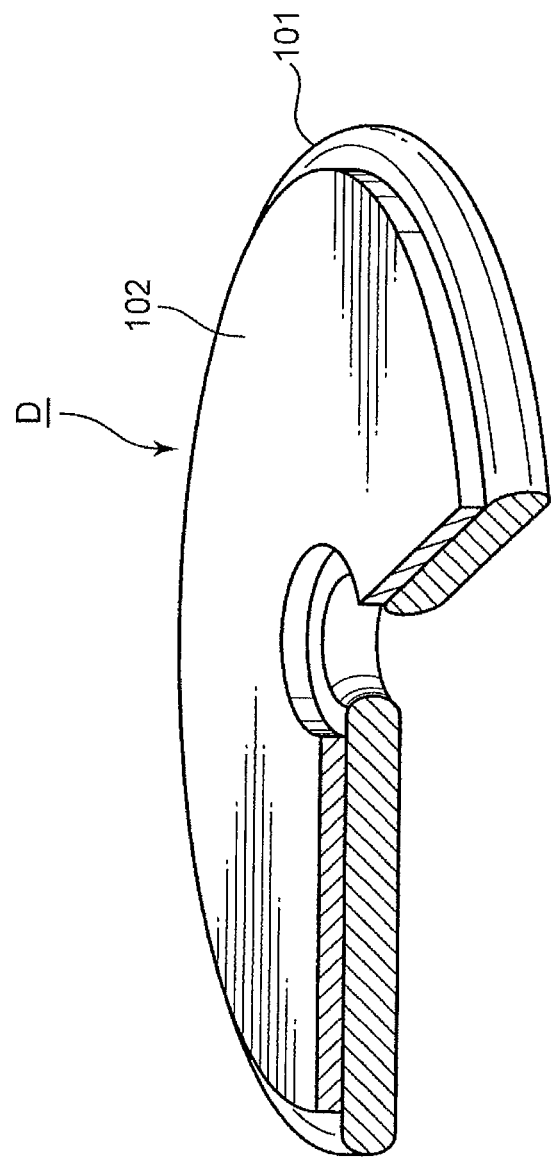

GLASS SUBSTRATE FOR INFORMATION RECORDING MEDIUM

TECHNICAL FIELD

The present invention relates to a glass substrate for an information recording medium which is used as a substrate for a recording medium that record information.

BACKGROUND ART

Information recording devices have been conventionally known which magnetically, optically or magneto-optically record information on information recording media and which may be represented by hard disk drives (HDDs). The hard disk drives magnetically record information on magnetic disks, which comprise recording layers formed on substrates, by means of magnetic heads. Known substrates generally include aluminum substrates and glass substrates, among which glass substrates have been increasingly used for applications for which a growing need for strength and reliability is felt such as laptops, on-vehicle devices, game machines etc. because glass substrates have high surface hardness, superior surface smoothness and less defects on surfaces. In hard disk drives, a magnetic head floats relative to a magnetic disk to write information on the magnetic disk. Recently, in order to improve recording density, reduction in flying height of magnetic heads is required.

In order to address this need, the dynamic flying height (DFH) control technique has recently been studied and developed in which, upon reading/writing information from/on an information recording medium, the distance between the so-called air bearing surface (ABS) and the information recording medium is reduced by bringing only a head element which is responsible for reading and writing in a magnetic head close to the information recording medium, and this technique is disclosed, for example, in Patent Document 1 and Non-Patent Document 1. In the DFH control techniques disclosed in Patent Document 1 and Non-Patent Document 1, the distance between a magnetic head and a magnetic disk is reduced by, upon reading/writing information from/on the magnetic disk, supplying electric power to a heater incorporated in the magnetic head to raise an ABS of the magnetic head opposing to the magnetic disk.

Patent Document 1: Japanese Patent Application Laid-open No. 2008-198307

Non-Patent Document 1: "Magnetic Head Slider Flying Height Control Technique by Micro Thermal Actuator and Its Progress", Journal of the Japan Society of Mechanical Engineers, June 2008, vol. 111, No. 1075, p. 541

SUMMARY OF THE INVENTION

An object of the present invention is to provide a glass substrate for an information recording medium which can further improve long term reliability of the information recording medium.

Namely, the glass substrate for an information recording medium of the present invention is characterized in containing the following glass components in % by weight:
$SiO_2$: 52 to 67%;
$Al_2O_3$: 8 to 20%;
$B_2O_3$: 0 to 6% (including zero);
(wherein FMO=$SiO_2$+$Al_2O_3$+$B_2O_3$=70 to 85%);
$Li_2O$: 0.5 to 4%;
$Na_2O$: 1 to 8%;
$K_2O$: 0 to 5% (including zero);
(wherein R2O=$Li_2O$+$Na_2O$+$K_2O$=5 to 15%);
MgO: 2 to 9%;
CaO: 0.1 to 5%;
BaO: 0 to 3% (including zero);
SrO: 0 to 3% (including zero);
ZnO: 0 to 5% (including zero);
(wherein MgO+CaO+BaO+SrO+ZnO=5 to 15%);
$Y_2O_3$: 0 to 4% (including zero);
$La_2O_3$: 0 to 4% (including zero);
$Gd_2O_3$: 0 to 4% (including zero);
$CeO_2$: 0 to 4% (including zero);
$TiO_2$: 1 to 7%;
$HfO_2$: 0 to 2% (including zero);
$ZrO_2$: 0 to 5% (including zero);
$Nb_2O_5$: 0.2 to 5%; and
$Ta_2O_5$: 0 to 5% (including zero); and
it satisfies the following composition relation formulas (1) to (4):

$$Li_2O/R2O: 0.05 \text{ to } 0.35 \qquad (1),$$

$$Li_2O/FMO: 0.005 \text{ to } 0.035 \qquad (2),$$

$$Li_2O/(MgO+ZnO): \text{less than } 2 \qquad (3) \text{ and}$$

$$Nb_2O_5/SiO_2: 0.01 \text{ to } 0.075 \qquad (4).$$

The above and other objectives, features and advantages of the present invention become apparent from the following detailed descriptions and attached FIGURE.

BRIEF DESCRIPTION OF THE DRAWING

The FIGURE is a partial sectional perspective diagram showing a magnetic disk which is an example of a magnetic recording medium obtained with a glass substrate for an information recording medium of an embodiment.

DESCRIPTION OF EMBODIMENTS

In the above DFH control techniques, a tip of the recording head comes closer to the surface of an information recording medium than an ABS which has played a role in lubrication and protection between the recording head and the information recording medium. Therefore wear due to contact due to fine defects or relatively low abnormal protrusions on the surface of the information recording medium which has been otherwise absorbed by the ABS becomes excessive than initially expected and, as a result, signal errors of the information recording medium are significantly increased such as removal of a recording layer or absence of detection of a signal in terms of long term reliability.

With the foregoing in view, an object of the present invention is to provide a glass substrate for an information recording medium which can further improve long term reliability of the information recording medium.

As a result of various searches and studies, the present inventors has found that very minute and thin deposits are produced such as about 10 to 2000 nm long and about 1 to 10 nm high on the surface of a recording layer, which are composite reaction products of an alkaline component derived from glass acting as a trigger with an ambient gas component, a protective component and a lubricating component of the surface layer of the information recording medium, and that the above object can be achieved by the following present invention.

Preferable embodiments and examples of the present invention are described hereinbelow. However, the present invention is not limited to the process for producing of the embodiments and examples described below.

<Glass Substrate for Information Recording Medium>

The glass substrate for an information recording medium according to the present embodiment contains the following glass components in % by weight:
$SiO_2$: 52 to 67%;
$Al_2O_3$: 8 to 20%;
$B_2O_3$: 0 to 6% (including zero);
(wherein FMO=$SiO_2$+$Al_2O_3$+$B_2O_3$=70 to 85%);
$Li_2O$: 0.5 to 4%;
$Na_2O$: 1 to 8%;
$K_2O$: 0 to 5% (including zero);
(wherein R2O=$Li_2O$+$Na_2O$+$K_2O$=5 to 15%);
MgO: 2 to 9%;
CaO: 0.1 to 5%;
BaO: 0 to 3% (including zero);
SrO: 0 to 3% (including zero);
ZnO: 0 to 5% (including zero);
(wherein MgO+CaO+BaO+SrO+ZnO=5 to 15%);
$Y_2O_3$: 0 to 4% (including zero);
$La_2O_3$: 0 to 4% (including zero);
$Gd_2O_3$: 0 to 4% (including zero);
$CeO_2$: 0 to 4% (including zero);
$TiO_2$: 1 to 7%;
$HfO_2$: 0 to 2% (including zero);
$ZrO_2$: 0 to 5% (including zero);
$Nb_2O_5$: 0.2 to 5%; and
$Ta_2O_5$: 0 to 5% (including zero); and
satisfies the following composition relation formulas (1) to (4):

$$Li_2O/R2O : 0.05 \text{ to } 0.35 \quad (1),$$

$$Li_2O/FMO : 0.005 \text{ to } 0.035 \quad (2),$$

$$Li_2O/(MgO+ZnO) : 0.2 \text{ to } 2.00 \quad (3) \text{ and}$$

$$Nb_2O_5/SiO_2 : 0.010 \text{ to } 0.075 \quad (4).$$

Namely, the glass substrate for an information recording medium according to the present embodiment contains glass components, on the basis of oxide represented by % by weight, wherein w (x) represents % by weight of a component(s) x, $52 \le w (SiO_2) \le 67\%$ of silicon oxide ($SiO_2$); $8 \le w (Al_2O_3) \le 20\%$ of aluminum oxide ($Al_2O_3$); $0 < w (B_2O_3) \le 6\%$ of boron oxide ($B_2O_3$) when contained; $0.5 \le w (Li_2O) \le 4\%$ of lithium oxide ($Li_2O$); $1 \le w (Na_2O) \le 8\%$ of sodium oxide ($Na_2O$); $0 < w (K_2O) \le 5\%$ of potassium oxide ($K_2O$) when contained; $2 \le w (MgO) \le 9\%$ of magnesium oxide (MgO); $0.1 \le w (CaO) \le 5\%$ of calcium oxide (CaO); $0 < w (BaO) \le 3\%$ of barium oxide (BaO) when contained; $0 < w (SrO) \le 3\%$ of strontium oxide (SrO) when contained; $0 < w (ZnO) \le 5\%$ of zinc oxide (ZnO) when contained; $0 < w (Y_2O_3) \le 4\%$ of yttrium oxide ($Y_2O_3$) when contained; $0 < w (La_2O_3) \le 4\%$ of lanthanum oxide ($La_2O_3$) when contained; $0 < w (Gd_2O_3) \le 4\%$ of gadolinium oxide ($Gd_2O_3$) when contained; $0 < w (CeO_2) \le 4\%$ of cerium oxide ($CeO_2$) when contained; $1 \le w (TiO_2) \le 7\%$ of titanium oxide ($TiO_2$); $0 < w (HfO_2) \le 2\%$ of hafnium oxide ($HfO_2$) when contained; $0 < w (ZrO_2) \le 5\%$ of zirconium oxide ($ZrO_2$) when contained; $0.2 \le w (Nb_2O_5) \le 5\%$ of niobium oxide; and $0 < w (Ta_2O_5) \le 5\%$ of tantalum oxide when contained, provided that $70 \le w (FMO) \le 85\%$, wherein FMO=$SiO_2$+$Al_2O_3$+$B_2O_3$, $5 \le w (R2O) \le 15\%$, wherein R2O=$Li_2O$+$Na_2O$+$K_2O$, and $5 \le w (MgO+CaO+BaO+SrO+ZnO) \le 15\%$, and satisfies the above composition relation formulas (1) to (4).

It should be noted that "%" as used herein in the context of glass composition represents "% by weight" unless otherwise stated. For sake of simplicity, in the above composition, $SiO_2$, $Al_2O_3$ and $B_2O_3$ may be referred to as "framework components", $Li_2O$, $Na_2O$ and $K_2O$ may be referred to as "alkaline components" and MgO, CaO, BaO, SrO and ZnO may be referred to as "bivalent metal components".

According to the research result by the present inventors, it has been found that the very minute and thin deposits on the surface of a recording layer of an information recording medium which are, for example, about 10 to 2000 nm long and about 1 to 10 nm high are composite reaction products of an alkaline component derived from glass acting as a trigger with an ambient gas component, a protective component and a lubricating component of the surface layer of the information recording medium, and it has been estimated that $Li_2O$ makes the largest contribution to the formation of the deposits. Accordingly, when the composition of $Li_2O$ is adjusted within the above range and the composition relation formulas (1) to (4) are met, behavior of alkaline elements can be controlled which are represented by Li, have low ionization energy and thus are easily ionized and can be easily transferred in the glass structure due to their small ionic radiuses. As a result, generation and growth of the reaction products, which are generated by the reaction of alkaline elements represented by Li with the ambient components such as ambient gas components, protective components and lubricating components at the surface of the information recording medium, can be suppressed or prevented. As a result, the glass substrate for an information recording medium of the present embodiment can improve long term reliability of an information recording medium upon reading and writing.

Particularly, the glass substrate for an information recording medium of the present embodiment can suppress generation of the very minute and thin deposits and therefore can have improved smoothness and flatness for a prolonged period of time. Therefore, it is suitable as a glass substrate for an information recording medium which is incorporated in an information recording medium based on the DFH control technique described above.

In addition, the glass substrate for an information recording medium of the present embodiment has the compositions in the ranges sufficient for attaining main properties which are required for e.g., a glass substrate for a hard disk drive (glass substrate for a magnetic disk), has high glass productivity and can achieve cost reduction which is required for glass substrates for hard disk drives.

Further, the glass substrate for an information recording medium does not contain hazardous gas components such as halogens, e.g., fluorine and chlorine or sulfur oxide ($SO_3$) or hazardous elements such as arsenic, antimony, lead, tin or cadmium, and therefore is environmentally-friendly glass.

The components of the glass substrate for an information recording medium of the present embodiment are further described in detail hereinbelow.

<Framework Components>

It is required that the glass substrate for an information recording medium of the present embodiment contains, as framework components, $52 \le w (SiO_2) \le 67\%$ of silicon oxide ($SiO_2$); $8 \le w (Al_2O_3) \le 20\%$ of aluminum oxide ($Al_2O_3$); $0 < w (B_2O_3) \le 6\%$ of boron oxide ($B_2O_3$) when contained, wherein w (FMO), the sum of $SiO_2$, $Al_2O_3$ and $B_2O_3$, is $70 \le w (FMO) \le 85\%$. The expression "$SiO_2$+$Al_2O_3$+$B_2O_3$=70 to 85%" as used herein means that the sum of $SiO_2$, $Al_2O_3$ and $B_2O_3$ is 70 to 85% (and it should be noted that the similar expressions have the similar meanings hereinbelow).

$SiO_2$ is a component constituting the framework of glass (matrix). When the content thereof is less than 52%, the glass structure is destabilized to deteriorate chemical durability and viscosity upon melting is deteriorated to deteriorate moldability. When the content is above 67%, melting property is deteriorated to reduce productivity and stiffness may be insufficient. Therefore the content is selected in the range of 52 to 67%. More preferable range is 54 to 66% and still more preferable range is 58 to 64%.

$Al_2O_3$ is also a component constituting the framework of glass and contributes to improvements in durability, strength and surface hardness of glass. Therefore, the content thereof of less than 8% is not preferable because durability and strength of the glass substrate for an information recording medium are not sufficient. On the other hand, the content thereof above 20% is not preferable because devitrification of glass tends to be increased to make stable glass production difficult. More preferable range is 10 to 18% and still more preferable range is 12 to 16%.

$B_2O_3$ has effects to improve melting property and thus improve productivity and to stabilize the glass structure by intervening in the framework of glass and thus improve chemical durability. However, $B_2O_3$ tends to be evaporated upon melting and may result in destabilization of glass component ratio. It also lowers the strength and thus hardness, resulting in the glass substrate which is liable to have scratches, has low fracture toughness value and is liable to break. Therefore, it is necessary for the content of $B_2O_3$ be 6% or less, preferably 5% or less and still more preferably 3% or less. It is also possible that $B_2O_3$ is not contained. The expression "0%" in the context of the content of $B_2O_3$ "0 to 6%" means that an aspect without $B_2O_3$ may also be encompassed. As used herein, the expression "0%" in the context of glass compositions has the same meaning and means that an aspect without the component in question may be encompassed (it should be noted that the similar expressions have the similar meanings hereinbelow).

It is also required that w (FMO), the sum of $SiO_2$, $Al_2O_3$ and $B_2O_3$, is 70 to 85% in order to stabilize the glass structure. When the sum is less than 70%, the glass structure is destabilized and when the sum is above 85%, viscosity upon melting is deteriorated and thus deteriorates productivity. The sum is more preferably in the range of 72 to 83% and still more preferably in the range of 74 to 81%.

<Alkaline Components>

It is required that the glass substrate for an information recording medium of the present embodiment contains, as alkaline components, 0.5≤w ($Li_2O$)≤4% of lithium oxide ($Li_2O$); 1≤w ($Na_2O$)≤8% of sodium oxide ($Na_2O$); 0<w ($K_2O$)≤5% of potassium oxide ($K_2O$) when contained, wherein w (R2O), the sum of $Li_2O$, $Na_2O$ and $K_2O$, is 5 to 15%.

$Li_2O$ has distinctive properties among alkaline metal elements, and improves solubility of glass while improves ion filling fraction in the glass structure to significantly improve the Young's modulus. When the content is less than 0.5%, sufficient effects on improvements in the solubility and Yong's modulus cannot be obtained. The content of above 4% is not preferable because it triggers the production of the very minute and thin deposits on the surface of a recording layer of an information recording medium, as described above. More preferred range is 0.8 to 3.5% and still more preferable range is 1.0 to 3.0%.

$Na_2O$ can reduce a melting point of glass and increase the coefficient of linear expansion. When the content is less than 1%, the melting point is not sufficiently reduced and when the content is above 8%, the elution amount thereof is increased to affect a recording layer. More preferable range is 1.5 to 7.0% and still more preferable range is 2.0 to 6.5%.

$K_2O$ has similar effects as $Na_2O$ described above and can be added for the purpose of improvement in melting property at the content not exceeding 5%. More preferable range is 0.1 to 4.0% and still more preferable range is 0.3 to 3.5%.

It is also required that w (R2O), the sum of $Li_2O$, $Na_2O$ and $K_2O$, is 5 to 15%. When the content is less than 8%, the melting point is not sufficiently reduced and when the content is above 21%, the elution amount thereof is increased to affect a recording layer. More preferable range is 6 to 12% and still more preferable range is 7 to 10%.

<Bivalent Metal Components>

It is required that the glass substrate for an information recording medium of the present embodiment contains, as bivalent metal components, 2≤w (MgO)≤9% of magnesium oxide (MgO); 0.1≤w (CaO)≤5% of calcium oxide (CaO); 0<w (BaO)≤3% of barium oxide (BaO) when contained; 0<w (SrO)≤3% of strontium oxide (SrO) when contained; 0<w (ZnO)≤5% of zinc oxide (ZnO) when contained, wherein w (MgO+CaO+BaO+SrO+ZnO), the sum of MgO, CaO, BaO, SrO and ZnO, is 5 to 15%.

MgO can increase stiffness and improve melting property. The $Mg^{2+}$ ion behaves similar to the $Li^+$ ion because it has high ionization tendency as well as has an ionic radius similar to that of the Li ion. Therefore, when these ions coexist in glass, they limit their behaviors to stabilize each other. When the content of MgO is less than 2%, sufficient effects on improvement in stiffness, improvement in melting property and limitation of $Li^+$ ion diffusion cannot be obtained. On the other hand, when the content is above 9%, the glass structure is destabilized, the melting productivity is decreased and chemical durability is decreased. More preferable range is 2.5 to 7.5% and still more preferable range is 2.8 to 7.0%.

CaO can increase the coefficient of thermal expansion and stiffness as well as improve melting property. When the content thereof is less than 0.1%, sufficient effects on improvements in the coefficient of thermal expansion and stiffness as well as in melting property cannot be obtained. On the other hand, when the content is above 5%, the glass structure is destabilized, the melting productivity is decreased and chemical durability is decreased. More preferable range is 0.3 to 4.0% and still more preferable range is 0.5 to 3.5%.

Although BaO, SrO and ZnO respectively can mainly improve melting property, the glass structure is destabilized when these components are contained excessively. Therefore, the contents thereof are required to be 3% of less for BaO and SrO, respectively, and 5% or less for SrO, with more preferable range being 2.5% or less for BaO and SrO and still more preferable range being 2.0% or less. It is also possible that they are not contained. ZnO can improve melting property as well as can suppress $Li^+$ ion diffusion because it has an ionic radius similar to that of the $Li^+$ ion and has a crosslinking configuration in the glass structure similar to that of the $Li^+$ ion. However, when it is contained excessively, it destabilizes the framework of glass itself and reduces chemical durability. Accordingly, it is required that ZnO is 5% or less, more preferably 4% or less and still more preferably 3.5% or less.

It is also required that w (MgO+CaO+BaO+SrO+ZnO), the sum of MgO, CaO, BaO, SrO and ZnO, is 5 to 15%. When the sum is less than 5%, sufficient effects on improvements in stiffness and melting property cannot be obtained and when it is above 15%, the glass structure is destabilized, melting productivity is decreased and chemical durability is decreased. More preferable range is 6 to 14% and still more preferable range is 7 to 12%.

<Modification Oxide Components>

$TiO_2$ can increase stiffness and improve melting property. When the amount of addition thereof is less than 1%, sufficient effects on improvements in stiffness and melting property cannot be obtained. On the other hand, when the content is above 7%, devitrification of glass is significantly increased to make stable melt molding impossible. More preferable range is 1.2 to 6.5% and still more preferable range is 1.5 to 6.0%.

$Nb_2O_5$ can improve melting property, strengthen the framework structure of glass and improve chemical durability even when it is added at a small amount. When the amount of addition thereof is less than 0.2%, sufficient effects due to the addition thereof cannot be obtained. On the other hand, when the content is above 5%, an excess amount is incorporated into the framework of glass itself and the flexibility of the framework structure is eliminated to even more deteriorate chemical durability. More preferable range is 0.3 to 4.0% and still more preferable range is 0.5 to 3.5%.

<Optional Components>

The glass substrate for an information recording medium of the present embodiment can contain, as other optional components, $0<w\ (Y_2O_3)\le 4\%$ of yttrium oxide ($Y_2O_3$) when contained; $0<w\ (La_2O_3)\le 4\%$ of lanthanum oxide ($La_2O_3$) when contained; $0<w\ (Gd_2O_3)\le 4\%$ of gadolinium oxide ($Gd_2O_3$) when contained; $0<w\ (CeO_2)\le 4\%$ of cerium oxide ($CeO_2$) when contained; $0<w\ (HfO_2)\le 2\%$ of hafnium oxide ($HfO_2$) when contained; $0<w\ (ZrO_2)\le 5\%$ of zirconium oxide ($ZrO_2$) when contained; and $0<w\ (Ta_2O_5)\le 5\%$ of tantalum oxide when contained.

These optional components can mainly make the glass structure firm and improve stiffness. These optional components may be used respectively alone or in combination of two or more components. When two or more components are used, it is preferable that the total amount thereof is 5.4% or less, although it is not particularly limited. When it is above 5.4%, the glass structure is extremely densified, processability is decreased due to excess improvement in stiffness, the surface quality is significantly deteriorated due to insufficient degree of processing and sufficient electromagnetic conversion characteristics cannot be obtained when a magnetic film is prepared. It is preferable that $CeO_2$ and $Sb_2O_3$ are contained at the above content ranges because they have defoaming or antiforming effect upon melting of glass.

<Other Additives>

If necessary, other oxide components which are generally known as additives for silicate glass may be added at appropriate amounts.

<Composition Relation Formulas>

It is also required that the glass substrate for an information recording medium of the present embodiment satisfies the above composition relation formulas (1) to (4) under the above compositions. When the above composition relation formulas (1) to (4) are met under the above compositions, behavior of alkaline elements can be controlled which are represented by Li, have low energy for ionization tendency and thus are easily ionized in the glass structure, as described above, and as a result, behavior of alkaline elements on the surface of an information recording medium can be controlled which are represented by Li, have low ionization energy and thus are easily be ionized and can be easily transferred in the glass structure due to their small ionic radiuses, as well as generation and growth of the reaction products with the ambient components such as ambient gas components, protective components and lubricating components can be suppressed or prevented. As a result, the glass substrate for an information recording medium of the present embodiment can further improve long term reliability of an information recording medium upon reading and writing.

Namely, $Li_2O/R_2O$ of less than 0.05 is not preferable because the structure cannot be chemically stabilized by the mixed alkaline effects and chemical durability cannot be sufficiently improved. On the other hand, $Li_2O/R_2O$ of above 0.35 is not preferable because the amount of Li relative to the total amount of alkaline elements is excessive and the effect for suppressing diffusion among alkaline ions may be difficult to be obtained, resulting in increase in the Li diffusion amount.

$Li_2O/FMO$ of less than 0.005 is not preferable because the amount of Li relative to the framework of glass is insufficient, ion filling density of the glass structure is not sufficiently increased and low Young's modulus may result. On the other hand, $Li_2O/FMO$ of above 0.035 is not preferable because the amount of Li ion in unsaturated state other than Li which is stably incorporated in the glass network is excessive and diffusion of Li is significantly increased.

$Li_2O/(MgO+ZnO)$ of above 2.00 is not preferable because sufficient suppression of Li diffusion depending on the ionic radius effect cannot be obtained, resulting in increase in the Li elution amount.

$Nb_2O_5/SiO_2$ of less than 0.01 is not preferable because the network binding of $SiO_2$ cannot be sufficiently strengthened. On the other hand, $Nb_2O_5/SiO_2$ of above 0.10 is not preferable because the binding of $SiO_2$ becomes excessively rigid and chemical flexibility is lost, resulting in destabilization of the structure.

The glass substrate for an information recording medium of the present embodiment preferably has Young's modulus E of 82 GPa or more; the specific elastic modulus $E/\rho$ of 31 or more, wherein $\rho$ is the specific gravity; Vickers hardness Hv of 550 to 650; Li extraction amount A measured after a predetermined accelerated test of 6 ppb or less per 2.5-inch disk; and Si amount S eluted in a predetermined elution test of less than 300 ppb per 2.5-inch disk.

The Young's modulus E of less than 82 GPa is not preferable because impact resistance is decreased when an information recording medium obtained with the glass substrate for an information recording medium is mounted and used on an information recording device.

The specific elastic modulus $E/\rho$ of less than 31 is not preferable because fluttering property is reduced and impact resistance in a rest condition is also reduced.

The Vickers hardness Hv of less than 550 is not preferable because the glass substrate for an information recording medium may easily have scratches on the surface thereof. The Vickers hardness Hv of above 650 is not preferable because excessive hardness thereof may reduce the processing efficiency of polishing, resulting in increase in cost.

The Li extraction amount A measured after a predetermined accelerated test of above 6 ppb per 2.5-inch disk is not preferable because the Li component is excessively diffused to reduce reliability. The predetermined accelerated test comprises maintaining a processed and cleaned 2.5-inch disk sample in a clean oven at 150° C. for 30 hours. The 2.5-inch disk in the context of "per 2.5-inch disk" as used herein refers to a disk having an outer diameter of 65 mm, an inner diameter of 20 mm and a thickness of 0.635 mm.

The Si amount S eluted in a predetermined elution test of above 300 ppb per 2.5-inch disk is not preferable because the processing speed is destabilized and the shape and quality are significantly varied. The predetermined elution test comprises soaking a processed and cleaned 2.5-inch disk sample in 50 ml of ultrapure water in a sealed container made of Teflon (registered trademark) resin, holding the container in a temperature-controlled bath at 80° C. for 24 hours for elution and removing the disk.

The glass substrate for an information recording medium of the present embodiment preferably has the glass transition point Tg of 550° C. or more and less than 650° C.

Internal diffusion of alkaline ions due to heating in the glass substrate for an information recording medium generally depends on the glass transition point Tg of glass itself. The higher the glass transition point Tg is, the slower the diffusion speed is; thus the transfer of the ions is suppressed. Because of this, the glass transition point is preferably 550° C. or more in view of further improving long term reliability of an information recording medium. On the other hand, when the glass transition point Tg is excessively high, the moldability during production process may be significantly decreased. In view of this, the glass transition point is preferably less than 650° C.

The glass substrate for an information recording medium of the present embodiment preferably has the coefficient of thermal expansion $\alpha$ of $45 \times 10^{-7}$ to $75 \times 10^{-7}$/° C.

When the coefficient of thermal expansion $\alpha$ is relatively low, alteration in the glass structure depending on the change in ambient temperature is less and diffusion of ions due to generation of distortions in glass is less occurred. On the other hand, when it is excessively low, an information recording medium cannot maintain affinity with a fastener member of an information recording device and the member may cause generation of distortion, resulting in even more deterioration of properties. In view of this, the coefficient of thermal expansion $\alpha$ is preferably $45 \times 10^{-7}$ to $75 \times 10^{-7}$/° C., as described above.

The glass substrate for an information recording medium of the present embodiment preferably exhibits substantially uniform stress state on a main surface thereof. Namely, it is preferable that the glass substrate for an information recording medium does not comprise a so-called chemically reinforced layer and does not comprise a compression stress layer on the surface thereof.

The existence of compression stress is not preferable because in microscopic glass structure of the glass substrate for an information recording medium, diffusion state is altered due to distortions and this eliminates the improvement in reliability mentioned above.

The chemical reinforcing refers to a process in which a monovalent metal ion included in the glass substrate for an information recording medium such as sodium or potassium ion is replaced by a monovalent metal ion having higher ionic radius than that of the former. This process can be carried out by a known conventional means, for example by soaking the glass substrate for an information recording medium in a treatment solution containing the monovalent metal ion having higher ionic radius at 200 to 400° C. The chemically reinforced layer is formed on the glass substrate for an information recording medium by this chemical reinforcing process. This chemical reinforcing process may improve mechanical strength of the glass substrate for an information recording medium.

The glass substrate for an information recording medium of the present embodiment preferably has the heat conductivity $\beta$ of 1 to 1.8 W/(mK).

The heat conductivity $\beta$ of less than 1 is not preferable because when a recording layer is formed on the glass substrate for an information recording medium is formed by sputtering, thermal energy at the surface of the film generated during sputtering may not be sufficiently distributed throughout the inside of the glass substrate for an information recording medium and heat is mainly applied to the interface of the glass substrate for an information recording medium and the film, resulting in increase in the diffusion speed of the Li component in the glass substrate for an information recording medium and reduction in suppression of diffusion in the glass structure. On the other hand, the heat conductivity $\beta$ of above 1.8 is not preferable because the glass substrate for an information recording medium excessively deprives heat from the film and makes thermal energy contributing to the growth of the film insufficient, resulting in deterioration of the properties (e.g., magnetic property) of the film and thus the recording layer.

The glass substrate for an information recording medium of the present embodiment preferably has the zeta potential amount $\zeta$ of −10 to 10 mV in an aqueous solution maintained in the pH range of 2 to 4.

In the final processing step of the production of the glass substrate for an information recording medium, maintenance of the zeta potential $\zeta$ in a specific range of −10 to 10 mV at the surface of the glass substrate for an information recording medium can suppress excess elution of alkaline elements represented by Li during the processing, allowing production of a highly reliable glass substrate for an information recording medium.

The glass substrate for an information recording medium of the present embodiment preferably has the liquidus temperature TL of 1350° C. or less and the viscosity $\gamma$ at the liquidus temperature of 0.5 to 10 Poise.

When the liquidus temperature is above 1350° C., the production of the glass substrate for an information recording medium may be difficult in some cases. Therefore, the liquidus temperature is preferably 1340° C. or less and more preferably 1300° C. or less. The lower limit of the liquidus temperature is not particularly limited. However, in view of incorporation of an appropriate amount of a component that can stabilize glass or maintenance of chemical durability in some extent, it is preferably 1050° C. or more.

When the viscosity at the liquidus temperature is less than 0.5 Poise, suitable glass drops may not be generated during molding of the glass substrate for an information recording medium, which may be an obstacle in molding of the glass substrate for an information recording medium. When it is above 10 Poise, the flowability of glass may not be appropriate during molding of the glass substrate for an information recording medium, which may be an obstacle in molding of the glass substrate for an information recording medium. Therefore, the viscosity at the liquidus temperature is preferably 0.6 to 9.8 Poise and more preferably 1.0 to 9.0 Poise.

The liquidus temperature TL can be measured by the following procedures. For example, a measurement sample is melted at 1550° C. for 2 hours in an electric furnace, the obtained rod-shaped molten glass is held in a temperature gradient furnace for 10 hours, the glass is quenched and analyzed to read the lower limit temperature at which devitrification does not occur from the gradient temperature, which serves as the liquidus temperature TL.

The viscosity at TL can be measured by the following procedures. For example, the viscosity of the molten glass is measured on a stirring-type viscometer (trade name: type TVB-20H viscometer, Advantest Corp.), which serves as the viscosity (log $\eta$) at the liquidus temperature TL.

<Production Method>

The method for producing the glass substrate for an information recording medium of the present embodiment may be any conventional method without particular limitation. For example, oxides, carbonates, nitrates, hydroxides and the like corresponding to the components constituting the glass substrate for an information recording medium are used as raw materials, weighed at desired proportions and mixed in the form of powder to obtain a prepared starting material. The prepared starting material is provided into a platinum crucible in an electric furnace heated at e.g., 1300 to 1550° C., melted and clarified followed by stirring and homogenization, casting in a preheated mold and slow cooling to obtain a glass block.

The glass block is held at a temperature around the glass transition point for 1 to 3 hours, followed by slow cooling for strain relief. The obtained glass block is cut into disk-shaped slices and carved out with a core drill as concentric circles with the inner circumference and outer circumference. Alternatively, the molten glass may be subjected to pressure molding into a disk shape.

The thus obtained disk-shaped glass substrate is coarsely polished and polished on both sides followed by cleaning with at least one liquid of water, acid and alkaline to yield the final glass substrate for an information recording medium. In the above procedures, chemical reinforcing may be carried out after coarse polishing and polishing of both sides by soaking the glass substrate into a mixed solution of potassium nitrate (50 wt %) and sodium nitrate (50 wt %) and the chemically reinforced layer may be then removed.

The glass substrate for an information recording medium of the present embodiment preferably has a disk shape, which makes the glass substrate suitable for an information recording medium to be loaded onto e.g., a hard disk drive. The size of the disk shape is not particularly limited and it may be, for example, a disk having 3.5-inch, 2.5-inch, 1.8-inch or smaller diameter. The thickness thereof may be 2 mm, 1 mm, 0.63 mm or thinner.

<Magnetic Recording Medium>

A magnetic recording medium obtained with the glass substrate for an information recording medium of the present embodiment is described hereinbelow.

FIG. 1 is a partial sectional perspective diagram showing a magnetic disk which is an example of the magnetic recording medium obtained with a glass substrate for an information recording medium of the embodiment. The magnetic disk D comprises a magnetic film 102 formed on the surface of a circular glass substrate for an information recording medium 101. The magnetic film 102 is formed by a known conventional formation method. For example, a method may be mentioned in which the magnetic film 102 is formed by spin-coating a thermosetting resin comprising magnetic particles dispersed therein on the glass substrate for an information recording medium 101 (spin-coating method); in which the magnetic film 102 is formed on the glass substrate for an information recording medium 101 by sputtering (sputtering method); or in which the magnetic film 102 is formed on the glass substrate for an information recording medium 101 by electroless plating (electroless plating method). The film thickness of the magnetic film 102 is about 0.3 µm to 1.2 µm in case of the spin-coating method, about 0.04 µm to 0.08 µm in case of the sputtering method and about 0.05 µm to 0.1 µm in case of the electroless plating method. In view of producing thin and highly dense films, the film is preferably formed by the sputtering method and by the electroless plating method.

The magnetic film 102 can be prepared with any known magnetic materials without particular limitation. It is preferable that the magnetic material is a Co-containing alloy which comprises Co having high crystal anisotropy for high coercivity as a basic material and Ni or Cr for adjusting residual magnetic flux density as an additional material. More specifically, the magnetic material may include CoPt, CoCr, CoNi, CoNiCr, CoCr Ta, CoPtCr, CoNiPt, CoNiCrPt, CoNiCrTa, CoCrPtTa, CoCrPtB, CoCrPtSiO and the like containing Co as a main component. The magnetic film 102 may have a multilayer structure (e.g., CoPtCr/CrMo/CoPtCr, CoCrPtTa/CrMo/CoCrPtTa etc.) intervened by a non-magnetic film (e.g., Cr, CrMo, CrV etc.) in order to reduce noise. The magnetic material for the magnetic film 102 may be, alternative to the above magnetic materials, a ferric or rare earth-iron material or may have a granular structure which is a non-magnetic film formed with $SiO_2$, BN and the like comprising magnetic particles such as Fe, Co, FeCo, CoNiPt and the like dispersed therein. The recording system on the magnetic film 102 may be any of longitudinal or vertical recording system.

In order to lubricate a magnetic head, the magnetic film 102 may be thinly coated with a lubricant on the surface thereof. The lubricant may include, for example, a liquid lubricant, perfluoropolyether (PFPE), diluted with a solvent such as the one containing Freon and the like.

If necessary, the magnetic film 102 may be provided with an underlayer or protective layer. The underlayer in the magnetic disk D may be appropriately selected according to the magnetic film 102. A material for the underlayer may include, for example, at least one material selected from non-magnetic metals such as Cr, Mo, Ta, Ti, W, V, B, Al, Ni and the like. When, for example, the magnetic film 102 comprises Co as a main component, the material for the underlayer is preferably elemental Cr or Cr alloy in view of improvement in magnetic properties. The underlayer is not limited to a single layer and may have a multilayer structure in which the same or different layers are stacked.

The underlayer having a multilayer structure may include a multilayer underlayer such as Cr/Cr, Cr/CrMo, Cr/CrV, NiAl/Cr, NiAl/CrMo, NiAl/CrV and the like. The protective layer which prevents wear or corrosion of the magnetic film 102 may include, for example, a Cr layer, a Cr alloy layer, a carbon layer, a hydrogenated carbon layer, a zirconium layer, a silica layer and the like. Such a protective layer may be successively formed with the underlayer and the magnetic film 102 on an in-line sputtering apparatus. The protective layer may be a single layer or may have a multilayer structure in which the same or different layers are stacked.

On the protective layer or alternative to the protective layer, another protective layer may be provided. For example, alternative to the above protective layer, a $SiO_2$ layer may be formed on a Cr layer. Such a $SiO_2$ layer may be formed by applying and then sintering, on the Cr layer, colloidal silica microparticles dispersed in tetraalkoxysilane diluted with an alcoholic solvent.

The magnetic recording medium obtained from the glass substrate for an information recording medium 101 of the present embodiment used as a substrate can record and reproduce information over a prolonged period of time with high reliability because the glass substrate for an information recording medium 101 has the above composition.

The embodiment has been described hereinabove in which the glass substrate for an information recording medium 101 is used for the magnetic recording medium. However, the present invention is not limited to this embodiment and the glass substrate for an information recording medium 101 of the present embodiment can be used for a magneto optical disk or an optical disk.

EXAMPLES AND COMPARATIVE EXAMPLES

Examples 1 to 40 and Comparative Examples A to F are now described. Powder starting materials at the amounts so as to give glass compositions as shown in Tables 1 to 9 were weighed into a platinum crucible, mixed and melted in an electric furnace at 1550° C. After the materials were sufficiently melted, a platinum agitating blade was placed in the molten glass for stirring for 1 hour. The agitating blade was then removed, and the molten glass was left for 30 minutes and then poured in a jig to obtain a glass block. The glass block was held at around the glass transition point of the respective glass for 2 hours and slowly cooled to relieve strain. The obtained glass block was cut into 2.5-inch disk-shaped slices of about 1.5 mm thick and carved out with a cutter as concentric circles with the inner circumference and outer circumference. The slices were subjected to coarse polishing and polishing on both sides, followed by cleaning to obtain glass substrates for an information recording medium of Examples and Comparative Examples. The obtained glass substrates for an information recording medium were subjected to the following evaluation for physical properties. The results are also shown in Tables 1 to 9.

<Li Elution Amount A after Accelerated Test>

After an accelerated test was performed in which a processed and cleaned 2.5-inch disk sample was held in a clean oven at 150° C. for 30 hours, the glass disk was soaked in 30 ml of ultrapure water under a clean environment at an ordinary temperature for 30 minutes. The disk was removed from the extraction liquid and the liquid used for extraction procedure was analyzed on an ICP mass spectrometer (trade name: Agilent 7700s, Agilent Technologies) to calculate the Li elution amount A per disk.

<Si Amount S Eluted in Elution Test>

A processed and cleaned 2.5-inch disk sample was soaked in 50 ml of ultrapure water in a sealed container made of Teflon (registered trademark) resin and the container was held in a temperature-controlled bath at 80° C. for 24 hours for elution. The elution solution was analyzed on an ICP optical emission spectrometer (trade name: SPS 7800, Seiko Instruments Inc.) to calculate the Si elution amount S per disk.

<Glass Transition Point Tg>

The powdered glass sample was heated and measured for a glass transition point on a differential thermal analyzer (trade name: EXSTAR 6000, Seiko Instruments Inc.) with a temperature increase rate of 10° C./min from a room temperature to 900° C.

<Young's Modulus E and Specific Elastic Modulus E/ρ>

Following "Testing methods for elastic modulus of fine ceramics" (JIS R 1602), a test piece of 80×20×2 mm was prepared from the glass block and measured for Young's modulus E on a free vibration-type modulus measurement apparatus (trade name: JE-RT, Nihon Tachno-Plus Co., Ltd.). The specific gravity p was measured according to the Archimedes method. The specific elastic modulus E/ρ was calculated from these measured values.

<Vickers Hardness Hv>

The Vickers hardness Hv was measured on a Vickers hardness tester (trade name: HM-112, Akashi Corporation) under an atmospheric environment with a load of 100 g and a load application time of 15 sec.

<Coefficient of Thermal Expansion α>

The coefficient of thermal expansion a was measured on a differential expansion analyzer (trade name: EXSTAR 6000, Seiko Instruments Inc.) with the following conditions: load: 5 g; temperature range: 25 to 100° C.; and temperature increase rate: 5° C./min. The measured values are the ones obtained by multiplying the value α in Tables 1 to 5 by $10^{-7}$.

<Heat Conductivity β>

The heat conductivity was measured by irradiating a laser pulse on one side of the measurement sample by a laser flash method and measuring the change in temperature on the other side.

TABLE 1

| COMPONENT | EXAMPLE 1 wt % | EXAMPLE 2 wt % | EXAMPLE 3 wt % | EXAMPLE 4 wt % | EXAMPLE 5 wt % |
|---|---|---|---|---|---|
| $SiO_2$ | 62.3 | 64.3 | 62.3 | 62.3 | 62.3 |
| $Al_2O_3$ | 14.8 | 10.8 | 12.8 | 14.8 | 14.8 |
| $B_2O_3$ | | | | | |
| $Li_2O$ | 2.8 | 2.8 | 2.8 | 2.8 | 2.8 |
| $Na_2O$ | 2.8 | 2.8 | 2.8 | 2.8 | 2.8 |
| $K_2O$ | 2.7 | 2.7 | 2.7 | 2.7 | 2.7 |
| MgO | 6.0 | 6.7 | 6.0 | 6.2 | 6.7 |
| CaO | 0.7 | 0.7 | 1.0 | 0.5 | 1.0 |
| SrO | | | 3.0 | | |
| BaO | | | | | |
| ZnO | | 3.0 | | | |
| $Y_2O_3$ | | | | | |
| $La_2O_3$ | | | | | |
| $Gd_2O_3$ | | | | | |
| $CeO_2$ | | | | | |
| $TiO_2$ | 4.6 | 4.2 | 4.6 | 4.1 | 4.6 |
| $HfO_2$ | | | | | |
| $ZrO_2$ | | | | 3.0 | |
| $SnO_2$ | | | | | |
| $P_2O_5$ | | | | | |
| $Nb_2O_5$ | 3.3 | 2.0 | 2.0 | 0.8 | 2.3 |
| $Ta_2O_5$ | | | | | |
| Total | 100.0 | 100.0 | 100.0 | 100.0 | 100.0 |
| $FMO(SiO_2 + Al_2O_3 + B_2O_3)$ | 77.1 | 75.1 | 75.1 | 77.1 | 77.1 |
| $R_2O(Li_2O + Na_2O + K_2O)$ | 8.3 | 8.3 | 8.3 | 8.3 | 8.3 |
| RO(MgO + CaO + SrO + BaO + ZnO) | 6.7 | 10.4 | 10.0 | 6.7 | 7.7 |
| $Li_2O/R_2O$ | 0.337 | 0.337 | 0.337 | 0.337 | 0.337 |
| $Li_2O$/FMO | 0.036 | 0.037 | 0.037 | 0.036 | 0.036 |
| $Li_2O/(MgO + ZnO)$ | 0.467 | 0.289 | 0.467 | 0.452 | 0.418 |
| $Nb_2O_5/SiO_2$ | 0.053 | 0.031 | 0.032 | 0.013 | 0.037 |
| Li EXTRACTION AMOUNT AFTER ACCELERATED TEST | | | | | |
| A (ppb/disk) | 3.9 | 4.6 | 4.9 | 5.5 | 8.5 |
| Si AMOUNT ELUTED IN ELUTION TEST | | | | | |
| S (ppb/disk) | 21 | 39 | 74 | 45 | 39 |
| GLASS TRANSITION TEMPERATURE Tg(° C.) | 619 | 610 | 611 | 624 | 631 |
| YOUNG'S MODULUS E (GPa) | 86.0 | 86.5 | 86.2 | 86.7 | 87.9 |
| SPECIFIC GRAVITY ρ (DENSITY g/Cm³) | 2.50 | 2.52 | 2.52 | 2.52 | 2.52 |
| SPECIFIC ELASTIC MODULUS E/ρ | 34.3 | 34.3 | 34.1 | 34.5 | 34.9 |
| VICKERS HARDNESS Hv | 594 | 602 | 617 | 611 | 620 |
| COEFFICIENT OF THERMAL EXPANSION α (25-100) | 54.7 | 56.3 | 58.0 | 57.4 | 52.0 |
| HEAT CONDUCTIVITY(W/(m·K)) | 1.05 | 1.13 | 1.12 | 1.05 | 1.07 |
| MEDIUM ERROR COUNT: RELIABILITY TEST | 33 | 28 | 32 | 37 | 56 |

TABLE 2

| COMPONENT | EXAMPLE 6 wt % | EXAMPLE 7 wt % | EXAMPLE 8 wt % | EXAMPLE 9 wt % | EXAMPLE 10 wt % |
|---|---|---|---|---|---|
| $SiO_2$ | 62.3 | 58.3 | 58.3 | 58.3 | 58.3 |
| $Al_2O_3$ | 14.8 | 14.9 | 14.9 | 14.9 | 14.9 |
| $B_2O_3$ | | 1.0 | 1.0 | 1.0 | 1.3 |
| $Li_2O$ | 2.8 | 2.3 | 2.4 | 2.3 | 2.0 |

TABLE 2-continued

| COMPONENT | EXAMPLE 6 wt % | EXAMPLE 7 wt % | EXAMPLE 8 wt % | EXAMPLE 9 wt % | EXAMPLE 10 wt % |
|---|---|---|---|---|---|
| $Na_2O$ | 2.8 | 3.4 | 3.4 | 3.4 | 3.4 |
| $K_2O$ | 2.5 | 4.7 | 4.7 | 4.7 | 4.7 |
| MgO | 7.0 | 5.3 | 5.3 | 5.3 | 5.3 |
| CaO | 0.2 | 1.0 | 1.0 | 3.9 | 3.9 |
| SrO | 3.0 | | | | |
| BaO | | | | | |
| ZnO | | 2.9 | 2.9 | | |
| $Y_2O_3$ | | | | | |
| $La_2O_3$ | | | | | |
| $Gd_2O_3$ | | | | | |
| $CeO_2$ | | 0.4 | 0.4 | | |
| $TiO_2$ | 3.6 | 4.0 | 5.0 | 4.0 | 4.0 |
| $HfO_2$ | | | | | |
| $ZrO_2$ | | | | | 0.3 |
| $SnO_2$ | | | | | |
| $P_2O_5$ | | | | | |
| $Nb_2O_5$ | 1.0 | 1.9 | 0.7 | 1.9 | 2.2 |
| $Ta_2O_5$ | | | | | |
| Total | 100.0 | 100.1 | 100.0 | 100.0 | 100.0 |
| FMO($SiO_2$ + $Al_2O_3$ + $B_2O_3$) | 77.1 | 74.2 | 74.2 | 74.2 | 74.5 |
| $R_2O$($Li_2O$ + $Na_2O$ + $K_2O$) | 8.1 | 10.4 | 10.5 | 10.4 | 10.1 |
| RO(MgO + CaO + SrO + BaO + ZnO) | 10.2 | 9.2 | 9.2 | 9.2 | 9.2 |
| $Li_2O/R_2O$ | 0.346 | 0.221 | 0.229 | 0.221 | 0.198 |
| $Li_2O$/FMO | 0.036 | 0.031 | 0.032 | 0.031 | 0.027 |
| $Li_2O$/(MgO + ZnO) | 0.400 | 0.280 | 0.293 | 0.434 | 0.377 |
| $Nb_2O_5/SiO_2$ | 0.016 | 0.033 | 0.012 | 0.033 | 0.038 |
| Li EXTRACTION AMOUNT AFTER ACCELERATED TEST A (ppb/disk) | 13.1 | 7.8 | 6.7 | 8.8 | 9.5 |
| Si AMOUNT ELUTED IN ELUTION TEST S (ppb/disk) | 69 | 76 | 61 | 288 | 280 |
| GLASS TRANSITION TEMPERATURE Tg(° C.) | 618 | 585 | 584 | 598 | 602 |
| YOUNG'S MODULUS E (GPa) | 87.8 | 83.8 | 83.4 | 83.3 | 84.0 |
| SPECIFIC GRAVITY ρ (DENSITY g/$Cm^3$) | 2.53 | 2.56 | 2.54 | 2.54 | 2.53 |
| SPECIFIC ELASTIC MODULUS E/ρ | 34.7 | 32.8 | 32.8 | 32.8 | 33.1 |
| VICKERS HARDNESS Hv | 615 | 632 | 629 | 615 | 609 |
| COEFFICIENT OF THERMAL EXPANSION α (25-100) | 55.0 | 65.7 | 65.8 | 67.2 | 65.7 |
| HEAT CONDUCTIVITY(W/(m·K)) | 1.11 | 1.22 | 1.22 | 1.22 | 1.20 |
| MEDIUM ERROR COUNT: RELIABILITY TEST | 88 | 70 | 73 | 89 | 78 |

TABLE 3

| COMPONENT | EXAMPLE 11 wt % | EXAMPLE 12 wt % | EXAMPLE 13 wt % | EXAMPLE 14 wt % | EXAMPLE 15 wt % |
|---|---|---|---|---|---|
| $SiO_2$ | 58.9 | 58.3 | 58.9 | 58.9 | 58.9 |
| $Al_2O_3$ | 15.0 | 14.9 | 15.0 | 15.0 | 14.0 |
| $B_2O_3$ | 1.3 | 1.3 | 1.3 | 2.3 | 2.3 |
| $Li_2O$ | 2.0 | 2.0 | 2.0 | 1.0 | 1.0 |
| $Na_2O$ | 5.4 | 3.4 | 4.4 | 5.4 | 5.4 |
| $K_2O$ | 1.8 | 4.7 | 1.7 | 1.8 | 1.8 |
| MgO | 5.3 | 5.3 | 5.3 | 5.3 | 5.3 |

TABLE 3-continued

| COMPONENT | EXAMPLE 11 wt % | EXAMPLE 12 wt % | EXAMPLE 13 wt % | EXAMPLE 14 wt % | EXAMPLE 15 wt % |
|---|---|---|---|---|---|
| CaO | 3.9 | 2.9 | 2.9 | 3.9 | 1.9 |
| SrO | | | | | |
| BaO | | | | | |
| ZnO | | 0.9 | 2.9 | | 2.9 |
| $Y_2O_3$ | | | | | |
| $La_2O_3$ | | | | | |
| $Gd_2O_3$ | | | | | |
| $CeO_2$ | | | | | |
| $TiO_2$ | 4.1 | 4.0 | 4.1 | 4.1 | 4.1 |
| $HfO_2$ | | | | | |
| $ZrO_2$ | | | | | |
| $SnO_2$ | | | | | |
| $P_2O_5$ | | | | 0.3 | |
| $Nb_2O_5$ | 2.3 | 2.3 | 1.5 | 2.0 | 2.4 |
| $Ta_2O_5$ | | | | | |
| Total | 100.0 | 100.0 | 100.0 | 100.0 | 100.0 |
| FMO($SiO_2$ + $Al_2O_3$ + $B_2O_3$) | 75.2 | 74.5 | 75.2 | 76.2 | 75.2 |
| $R_2O$($Li_2O$ + $Na_2O$ + $K_2O$) | 9.2 | 10.1 | 8.1 | 8.2 | 8.2 |
| RO(MgO + CaO + SrO + BaO + ZnO) | 9.2 | 9.1 | 11.1 | 9.2 | 10.1 |
| $Li_2O/R_2O$ | 0.217 | 0.198 | 0.247 | 0.122 | 0.122 |
| $Li_2O$/FMO | 0.027 | 0.027 | 0.027 | 0.013 | 0.013 |
| $Li_2O$/(MgO + ZnO) | 0.377 | 0.323 | 0.244 | 0.189 | 0.122 |
| $Nb_2O_5/SiO_2$ | 0.039 | 0.039 | 0.025 | 0.034 | 0.041 |
| Li EXTRACTION AMOUNT AFTER ACCELERATED TEST A (ppb/disk) | 10.2 | 11.2 | 9.3 | 4.8 | 5.3 |
| Si AMOUNT ELUTED IN ELUTION TEST S (ppb/disk) | 245 | 99 | 180 | 169 | 253 |
| GLASS TRANSITION TEMPERATURE Tg(° C.) | 598 | 596 | 594 | 631 | 622 |
| YOUNG'S MODULUS E (GPa) | 85.0 | 82.8 | 84.9 | 82.4 | 82.5 |
| SPECIFIC GRAVITY ρ (DENSITY g/$Cm^3$) | 2.54 | 2.54 | 2.56 | 2.52 | 2.53 |
| SPECIFIC ELASTIC MODULUS E/ρ | 33.5 | 32.6 | 33.2 | 32.7 | 32.5 |
| VICKERS HARDNESS Hv | 606 | 613 | 614 | 589 | 609 |
| COEFFICIENT OF THERMAL EXPANSION α (25-100) | 65.2 | 63.7 | 62.8 | 58.8 | 58.5 |
| HEAT CONDUCTIVITY(W/(m·K)) | 1.15 | 1.20 | 1.13 | 1.10 | 1.12 |
| MEDIUM ERROR COUNT: RELIABILITY TEST | 90 | 81 | 70 | 55 | 23 |

TABLE 4

| COMPONENT | EXAMPLE 16 wt % | EXAMPLE 17 wt % | EXAMPLE 18 wt % | EXAMPLE 19 wt % | EXAMPLE 20 wt % |
|---|---|---|---|---|---|
| $SiO_2$ | 58.9 | 58.9 | 61.1 | 58.9 | 59.2 |
| $Al_2O_3$ | 15.0 | 15.0 | 13.0 | 15.0 | 15.1 |
| $B_2O_3$ | 1.3 | 1.5 | 1.3 | 2.3 | 2.3 |
| $Li_2O$ | 2.0 | 1.8 | 1.8 | 1.0 | 1.0 |
| $Na_2O$ | 5.4 | 5.4 | 5.4 | 5.4 | 6.4 |
| $K_2O$ | 1.8 | 1.8 | 1.8 | 1.8 | 0.3 |
| MgO | 5.3 | 5.3 | 5.3 | 5.3 | 5.4 |
| CaO | 3.9 | 3.9 | 3.9 | 3.9 | 3.9 |
| SrO | | | | | |
| BaO | | | | | |
| ZnO | | | | | |
| $Y_2O_3$ | | | | | |

TABLE 4-continued

| COMPONENT | EXAMPLE 16 wt % | EXAMPLE 17 wt % | EXAMPLE 18 wt % | EXAMPLE 19 wt % | EXAMPLE 20 wt % |
|---|---|---|---|---|---|
| $La_2O_3$ | | | | | |
| $Gd_2O_3$ | | | | | |
| $CeO_2$ | | | | | 0.3 |
| $TiO_2$ | 3.1 | 5.1 | 5.1 | 5.1 | 5.1 |
| $HfO_2$ | | | | | |
| $ZrO_2$ | | | | | |
| $SnO_2$ | 0.3 | 0.3 | 0.3 | 0.3 | |
| $P_2O_5$ | | | | | |
| $Nb_2O_5$ | 3.0 | 1.0 | 1.0 | 1.0 | 1.0 |
| $Ta_2O_5$ | | | | | |
| Total | 100.0 | 100.0 | 100.0 | 100.0 | 100.0 |
| FMO($SiO_2$ + $Al_2O_3$ + $B_2O_3$) | 75.2 | 75.4 | 75.4 | 76.2 | 76.6 |
| $R_2O$($Li_2O$ + $Na_2O$ + $K_2O$) | 9.2 | 9.0 | 9.0 | 8.2 | 7.7 |
| RO(MgO + CaO + SrO + BaO + ZnO) | 9.2 | 9.2 | 9.2 | 9.2 | 9.3 |
| $Li_2O/R_2O$ | 0.217 | 0.200 | 0.200 | 0.122 | 0.130 |
| $Li_2O$/FMO | 0.027 | 0.024 | 0.024 | 0.013 | 0.013 |
| $Li_2O$/(MgO + ZnO) | 0.377 | 0.340 | 0.340 | 0.189 | 0.185 |
| $Nb_2O_5/SiO_2$ | 0.051 | 0.017 | 0.016 | 0.017 | 0.017 |
| Li EXTRACTION AMOUNT AFTER ACCELERATED TEST A (ppb/disk) | 9.9 | 9.2 | 8.1 | 4.9 | 6.8 |
| Si AMOUNT ELUTED IN ELUTION TEST S (ppb/disk) | 113 | 177 | 139 | 162 | 202 |
| GLASS TRANSITION TEMPERATURE Tg(° C.) | 604 | 598 | 594 | 630 | 627 |
| YOUNG'S MODULUS E (GPa) | 85.2 | 85.0 | 84.9 | 82.2 | 83.2 |
| SPECIFIC GRAVITY ρ (DENSITY g/Cm³) | 2.54 | 2.54 | 2.53 | 2.51 | 2.52 |
| SPECIFIC ELASTIC MODULUS E/ρ | 33.6 | 33.5 | 33.6 | 32.7 | 33.0 |
| VICKERS HARDNESS Hv | 607 | 601 | 600 | 602 | 600 |
| COEFFICIENT OF THERMAL EXPANSION α (25-100) | 62.8 | 65.0 | 64.3 | 60.2 | 61.0 |
| HEAT CONDUCTIVITY(W/(m·K)) | 1.15 | 1.14 | 1.14 | 1.10 | 1.07 |
| MEDIUM ERROR COUNT: RELIABILITY TEST | 67 | 87 | 56 | 19 | 41 |

TABLE 5

| COMPONENT | EXAMPLE 21 wt % | EXAMPLE 22 wt % | EXAMPLE 23 wt % | EXAMPLE 24 wt % | EXAMPLE 25 wt % |
|---|---|---|---|---|---|
| $SiO_2$ | 57.2 | 56.2 | 56.2 | 54.2 | 59.3 |
| $Al_2O_3$ | 17.1 | 17.1 | 17.1 | 17.1 | 15.1 |
| $B_2O_3$ | 2.3 | 3.3 | 3.3 | 5.3 | 2.3 |
| $Li_2O$ | 1.0 | 1.2 | 1.2 | 1.2 | 1.0 |
| $Na_2O$ | 6.4 | 6.4 | 6.4 | 6.4 | 6.4 |
| $K_2O$ | 0.3 | 0.3 | 0.3 | 0.3 | 0.7 |
| MgO | 5.4 | 5.4 | 5.4 | 5.4 | 6.0 |
| CaO | 3.9 | 3.9 | 3.9 | 3.9 | 3.1 |
| SrO | | | | | |
| BaO | | | | | |
| ZnO | | | | | |
| $Y_2O_3$ | | | | | |
| $La_2O_3$ | | | | | |
| $Gd_2O_3$ | | | | | |
| $CeO_2$ | 0.3 | 0.3 | 0.3 | 0.3 | |
| $TiO_2$ | 5.1 | 5.1 | 4.9 | 5.1 | 5.1 |
| $HfO_2$ | | | | | |
| $ZrO_2$ | | | | | |
| $SnO_2$ | | | | | |
| $P_2O_5$ | | | | | |
| $Nb_2O_5$ | 1.0 | 0.8 | 1.0 | 0.8 | 1.0 |
| $Ta_2O_5$ | | | | | |
| Total | 100.0 | 100.0 | 100.0 | 100.0 | 100.0 |
| FMO($SiO_2$ + $Al_2O_3$ + $B_2O_3$) | 76.6 | 76.6 | 76.6 | 76.6 | 76.7 |
| $R_2O$($Li_2O$ + $Na_2O$ + $K_2O$) | 7.7 | 7.9 | 7.9 | 7.9 | 8.1 |
| RO(MgO + CaO + SrO + BaO + ZnO) | 9.3 | 9.3 | 9.3 | 9.3 | 9.1 |
| $Li_2O/R_2O$ | 0.130 | 0.152 | 0.152 | 0.152 | 0.123 |
| $Li_2O$/FMO | 0.013 | 0.016 | 0.016 | 0.016 | 0.013 |
| $Li_2O$/(MgO + ZnO) | 0.185 | 0.222 | 0.222 | 0.222 | 0.167 |
| $Nb_2O_5/SiO_2$ | 0.017 | 0.014 | 0.018 | 0.015 | 0.017 |
| Li EXTRACTION AMOUNT AFTER ACCELERATED TEST A (ppb/disk) | 5.9 | 6.4 | 5.7 | 6.8 | 4.3 |
| Si AMOUNT ELUTED IN ELUTION TEST S (ppb/disk) | 221 | 272 | 186 | 289 | 192 |
| GLASS TRANSITION TEMPERATURE Tg(° C.) | 631 | 616 | 615 | 604 | 629 |
| YOUNG'S MODULUS E (GPa) | 84.2 | 83.8 | 83.8 | 82.6 | 83.0 |
| SPECIFIC GRAVITY ρ (DENSITY g/Cm³) | 2.53 | 2.53 | 2.53 | 2.52 | 2.52 |
| SPECIFIC ELASTIC MODULUS E/ρ | 33.3 | 33.2 | 33.1 | 32.8 | 32.9 |
| VICKERS HARDNESS Hv | 613 | 602 | 598 | 600 | 599 |
| COEFFICIENT OF THERMAL EXPANSION α (25-100) | 59.2 | 59.0 | 60.4 | 59.8 | 55.2 |
| HEAT CONDUCTIVITY(W/(m·K)) | 1.07 | 1.08 | 1.08 | 1.08 | 1.09 |
| MEDIUM ERROR COUNT: RELIABILITY TEST | 36 | 36 | 51 | 44 | 28 |

TABLE 6

| COMPONENT | EXAMPLE 26 wt % | EXAMPLE 27 wt % | EXAMPLE 28 wt % | EXAMPLE 29 wt % | EXAMPLE 30 wt % |
|---|---|---|---|---|---|
| $SiO_2$ | 59.2 | 58.9 | 59.2 | 59.2 | 59.8 |
| $Al_2O_3$ | 15.1 | 15.0 | 15.1 | 15.1 | 14.8 |
| $B_2O_3$ | 4.3 | 1.3 | 1.3 | 1.3 | 1.1 |
| $Li_2O$ | 1.0 | 2.0 | 2.3 | 2.0 | 3.0 |
| $Na_2O$ | 6.6 | 5.4 | 6.4 | 6.4 | 5.5 |
| $K_2O$ | | 1.8 | 0.3 | 0.3 | 0.3 |
| MgO | 5.4 | 4.3 | 5.4 | 5.4 | 5.4 |
| CaO | 3.9 | 3.9 | 3.9 | 1.0 | 4.0 |
| SrO | | | | | |
| BaO | | | | | |
| ZnO | | | | 2.9 | |
| $Y_2O_3$ | | | | | |
| $La_2O_3$ | | | | | |
| $Gd_2O_3$ | | | | | |
| $CeO_2$ | | | | | |
| $TiO_2$ | 3.1 | 6.0 | 4.1 | 4.4 | 4.1 |
| $HfO_2$ | | | | | |
| $ZrO_2$ | | | | | |

TABLE 6-continued

| COMPONENT | EXAMPLE 26 wt % | EXAMPLE 27 wt % | EXAMPLE 28 wt % | EXAMPLE 29 wt % | EXAMPLE 30 wt % |
|---|---|---|---|---|---|
| $SnO_2$ | | | | | |
| $P_2O_5$ | | | | | |
| $Nb_2O_5$ | 1.4 | 1.4 | 2.0 | 2.0 | 2.0 |
| $Ta_2O_5$ | | | | | |
| Total | 100.0 | 100.0 | 100.0 | 100.0 | 100.0 |
| FMO($SiO_2$ + $Al_2O_3$ + $B_2O_3$) | 78.6 | 75.2 | 75.6 | 75.6 | 75.7 |
| $R_2O$($Li_2O$ + $Na_2O$ + $K_2O$) | 7.6 | 9.2 | 9.0 | 8.7 | 8.8 |
| RO(MgO + CaO + SrO + BaO + ZnO) | 9.3 | 8.2 | 9.3 | 9.3 | 9.4 |
| $Li_2O/R_2O$ | 0.132 | 0.217 | 0.256 | 0.230 | 0.341 |
| $Li_2O$/FMO | 0.013 | 0.027 | 0.030 | 0.026 | 0.040 |
| $Li_2O$/(MgO + ZnO) | 0.185 | 0.465 | 0.426 | 0.241 | 0.556 |
| $Nb_2O_5/SiO_2$ | 0.024 | 0.024 | 0.034 | 0.034 | 0.033 |
| Li EXTRACTION AMOUNT AFTER ACCELERATED TEST A (ppb/disk) | 6.5 | 11.1 | 8.9 | 10.1 | 12.3 |
| Si AMOUNT ELUTED IN ELUTION TEST S (ppb/disk) | 256 | 288 | 187 | 118 | 171 |
| GLASS TRANSITION TEMPERATURE Tg(° C.) | 610 | 602 | 606 | 592 | 591 |
| YOUNG'S MODULUS E (GPa) | 82.1 | 85.7 | 85.6 | 85.0 | 87.3 |
| SPECIFIC GRAVITY ρ (DENSITY g/$Cm^3$) | 2.49 | 2.54 | 2.54 | 2.55 | 2.54 |
| SPECIFIC ELASTIC MODULUS E/ρ | 33.0 | 33.8 | 33.7 | 33.3 | 33.9 |
| VICKERS HARDNESS Hv | 598 | 596 | 600 | 600 | 621 |
| COEFFICIENT OF THERMAL EXPANSION α (25-100) | 59.8 | 63.2 | 60.8 | 58.9 | 59.9 |
| HEAT CONDUCTIVITY(W/(m·K)) | 1.07 | 1.13 | 1.14 | 1.13 | 1.13 |
| MEDIUM ERROR COUNT: RELIABILITY TEST | 34 | 78 | 70 | 83 | 82 |

TABLE 7

| COMPONENT | EXAMPLE 31 wt % | EXAMPLE 32 wt % | EXAMPLE 33 wt % | EXAMPLE 34 wt % | EXAMPLE 35 wt % |
|---|---|---|---|---|---|
| $SiO_2$ | 59.2 | 58.9 | 59.2 | 62.2 | 63.2 |
| $Al_2O_3$ | 15.1 | 15.0 | 15.1 | 12.1 | 12.1 |
| $B_2O_3$ | 2.8 | 2.3 | 2.3 | 2.3 | 2.3 |
| $Li_2O$ | 2.0 | 1.0 | 1.0 | 1.0 | 1.5 |
| $Na_2O$ | 6.4 | 5.4 | 6.4 | 6.4 | 6.0 |
| $K_2O$ | 0.6 | 1.8 | 0.3 | 0.3 | 0.3 |
| MgO | 5.4 | 5.3 | 5.4 | 5.4 | 4.4 |
| CaO | 1.0 | 2.9 | 2.9 | 3.9 | 3.9 |
| SrO | | | | | |
| BaO | | | | | |
| ZnO | 1.4 | | | | |
| $Y_2O_3$ | | | | | |
| $La_2O_3$ | | | | | |
| $Gd_2O_3$ | | | | | |
| $CeO_2$ | | | | | |
| $TiO_2$ | 4.1 | 6.0 | 6.1 | 5.1 | 5.0 |
| $HfO_2$ | | | | | |
| $ZrO_2$ | | | | | |
| $SnO_2$ | | | | | |
| $P_2O_5$ | | | | | |
| $Nb_2O_5$ | 2.0 | 1.4 | 1.3 | 1.3 | 1.3 |
| $Ta_2O_5$ | | | | | |
| Total | 100.0 | 100.0 | 100.0 | 100.0 | 100.0 |
| FMO($SiO_2$ + $Al_2O_3$ + $B_2O_3$) | 77.1 | 76.2 | 76.6 | 76.6 | 77.6 |
| $R_2O$($Li_2O$ + $Na_2O$ + $K_2O$) | 9.0 | 8.2 | 7.7 | 7.7 | 7.8 |
| RO(MgO + CaO + SrO + BaO + ZnO) | 7.8 | 8.2 | 8.3 | 9.3 | 8.3 |
| $Li_2O/R_2O$ | 0.222 | 0.122 | 0.130 | 0.130 | 0.192 |
| $Li_2O$/FMO | 0.026 | 0.013 | 0.013 | 0.013 | 0.019 |
| $Li_2O$/(MgO + ZnO) | 0.294 | 0.189 | 0.185 | 0.185 | 0.341 |
| $Nb_2O_5/SiO_2$ | 0.034 | 0.024 | 0.022 | 0.021 | 0.021 |
| Li EXTRACTION AMOUNT AFTER ACCELERATED TEST A (ppb/disk) | 7.2 | 4.5 | 4.0 | 4.3 | 5.6 |
| Si AMOUNT ELUTED IN ELUTION TEST S (ppb/disk) | 112 | 121 | 132 | 103 | 88 |
| GLASS TRANSITION TEMPERATURE Tg(° C.) | 593 | 630 | 630 | 616 | 596 |
| YOUNG'S MODULUS E (GPa) | 83.0 | 83.2 | 83.3 | 82.6 | 84.0 |
| SPECIFIC GRAVITY ρ (DENSITY g/$Cm^3$) | 2.51 | 2.52 | 2.52 | 2.50 | 2.50 |
| SPECIFIC ELASTIC MODULUS E/ρ | 33.0 | 33.1 | 33.1 | 33.0 | 33.6 |
| VICKERS HARDNESS Hv | 602 | 595.1 | 592.4 | 603 | 596 |
| COEFFICIENT OF THERMAL EXPANSION α (25-100) | 63.4 | 59.1 | 62.0 | 60.4 | 60.4 |
| HEAT CONDUCTIVITY(W/(m·K)) | 1.11 | 1.08 | 1.05 | 1.07 | 1.06 |
| MEDIUM ERROR COUNT: RELIABILITY TEST | 49 | 22 | 10 | 19 | 23 |

TABLE 8

| COMPONENT | EXAMPLE 36 wt % | EXAMPLE 37 wt % | EXAMPLE 38 wt % | EXAMPLE 39 wt % | EXAMPLE 40 wt % |
|---|---|---|---|---|---|
| $SiO_2$ | 58.3 | 58.9 | 59.3 | 59.3 | 58.9 |
| $Al_2O_3$ | 14.9 | 15.0 | 15.1 | 15.1 | 15.0 |
| $B_2O_3$ | 2.4 | 2.4 | 2.5 | 0.5 | 2.9 |
| $Li_2O$ | 2.4 | 2.4 | 2.4 | 2.4 | 1.0 |
| $Na_2O$ | 3.4 | 5.4 | 6.5 | 6.5 | 6.3 |
| $K_2O$ | 4.6 | 1.6 | | | 1.6 |
| MgO | 5.3 | 5.3 | 5.4 | 5.4 | 5.3 |
| CaO | 3.4 | 3.4 | 3.4 | 3.4 | 3.2 |
| SrO | | | | | |
| BaO | | | | | |
| ZnO | 2.0 | 2.9 | 3.0 | 5.0 | 2.4 |
| $Y_2O_3$ | | | | | |
| $La_2O_3$ | | | | | |
| $Gd_2O_3$ | | | | | |
| $CeO_2$ | 0.4 | | | | |
| $TiO_2$ | 2.0 | 1.6 | 1.7 | 1.4 | 2.1 |
| $HfO_2$ | | | | | |
| $ZrO_2$ | | | | | 0.5 |
| $SnO_2$ | | | | | |
| $P_2O_5$ | | | | | |

TABLE 8-continued

| COMPONENT | EXAMPLE 36 wt % | EXAMPLE 37 wt % | EXAMPLE 38 wt % | EXAMPLE 39 wt % | EXAMPLE 40 wt % |
|---|---|---|---|---|---|
| $Nb_2O_5$ | 0.9 | 1.1 | 0.7 | 1.0 | 0.8 |
| $Ta_2O_5$ | | | | | |
| Total | 100.0 | 100.0 | 100.0 | 100.0 | 100.0 |
| $FMO(SiO_2 + Al_2O_3 + B_2O_3)$ | 75.6 | 76.3 | 76.9 | 74.9 | 76.8 |
| $R_2O(Li_2O + Na_2O + K_2O)$ | 10.4 | 9.4 | 8.9 | 8.9 | 8.9 |
| $RO(MgO + CaO + SrO + BaO + ZnO)$ | 10.7 | 11.6 | 11.8 | 13.8 | 10.9 |
| $Li_2O/R_2O$ | 0.231 | 0.255 | 0.270 | 0.270 | 0.112 |
| $Li_2O/FMO$ | 0.032 | 0.031 | 0.031 | 0.032 | 0.013 |
| $Li_2O/(MgO + ZnO)$ | 0.329 | 0.293 | 0.286 | 0.231 | 0.130 |
| $Nb_2O_5/SiO_2$ | 0.015 | 0.019 | 0.012 | 0.017 | 0.014 |
| Li EXTRACTION AMOUNT AFTER ACCELERATED TEST A (ppb/disk) | 9.3 | 7.8 | 7.0 | 7.2 | 5.8 |
| Si AMOUNT ELUTED IN ELUTION TEST S (ppb/disk) | 255 | 278 | 253 | 188 | 201 |
| GLASS TRANSITION TEMPERATURE Tg(° C.) | 574 | 566 | 563 | 582 | 601 |
| YOUNG'S MODULUS E (GPa) | 82.5 | 84.6 | 85.3 | 85.4 | 82.0 |
| SPECIFIC GRAVITY ρ (DENSITY g/Cm³) | 2.53 | 2.55 | 2.54 | 2.57 | 2.53 |
| SPECIFIC ELASTIC MODULUS E/ρ | 32.6 | 33.2 | 33.6 | 33.2 | 32.4 |
| VICKERS HARDNESS Hv | 611 | 604 | 601 | 614 | 601 |
| COEFFICIENT OF THERMAL EXPANSION α (25-100) | 64.6 | 64.0 | 62.5 | 60.6 | 62.3 |
| HEAT CONDUCTIVITY(W/(m · K)) | 1.25 | 1.21 | 1.19 | 1.23 | 1.17 |
| MEDIUM ERROR COUNT: RELIABILITY TEST | 64 | 54 | 50 | 62 | 38 |

TABLE 9

| COMPONENT | COMPARATIVE EXAMPLE A wt % | COMPARATIVE EXAMPLE B wt % | COMPARATIVE EXAMPLE C wt % | COMPARATIVE EXAMPLE D wt % | COMPARATIVE EXAMPLE E wt % | COMPARATIVE EXAMPLE F wt % |
|---|---|---|---|---|---|---|
| SiO2 | 53.1 | 56.1 | 55.5 | 55.5 | 63.4 | 66.8 |
| Al2O3 | 5.6 | 5.6 | 8.5 | 11.5 | 11.5 | 9.3 |
| B2O3 | 3.9 | 3.9 | 3.9 | 3.9 | 5.6 | 5.4 |
| Li2O | 4.1 | 4.1 | 6.4 | 9.4 | 5.5 | 4.5 |
| Na2O | 4.5 | 4.5 | 2.9 | 1.9 | 4.3 | 5.0 |
| K2O | 2.3 | 2.3 | 2.4 | 2.4 | 9.3 | 2.5 |
| MgO | 4.3 | 4.3 | 6.2 | 2.2 | | |
| CaO | 6.3 | 6.3 | 1.3 | 2.2 | | |
| SrO | | | | | | |
| BaO | | | | | | |
| ZnO | | | | | | |
| Y2O3 | | | | | | |
| La2O3 | 1.9 | 4.9 | 4.8 | 4.8 | | 2.4 |
| Gd2O3 | 0.1 | 0.1 | | | | |
| CeO2 | | | | 0.3 | | |
| TiO2 | 6.5 | 3.5 | 3.5 | 2.5 | | 1.9 |
| HfO2 | | | | | | |
| ZrO2 | 7.4 | 4.4 | 4.3 | 3.7 | 0.3 | 1.9 |
| SnO2 | | | | | | 0.3 |
| P2O5 | | | | | | |
| Nb2O5 | | | | | 0.1 | |
| Ta2O5 | | | | | | |
| Total | 100.0 | 100.0 | 100.0 | 100.0 | 100.0 | 100.0 |
| FMO(SiO2 + Al2O3 + B2O3) | 62.6 | 65.6 | 67.9 | 70.9 | 80.5 | 81.5 |
| R2O(Li2O + Na2O + K2O) | 10.9 | 10.9 | 11.7 | 13.7 | 19.1 | 12.0 |
| RO(MgO + CaO + SrO + BaO + ZnO) | 10.6 | 10.6 | 7.5 | 4.4 | 0.0 | 0.0 |
| Li2O/R2O | 0.376 | 0.376 | 0.547 | 0.686 | 0.288 | 0.375 |
| Li2O/FMO | 0.065 | 0.063 | 0.094 | 0.133 | 0.068 | 0.055 |
| Li2O/(MgO + ZnO) | 0.953 | 0.953 | 1.032 | 4.273 | | |
| Nb2O5/SiO2 | 0.000 | 0.000 | 0.000 | 0.000 | 0.002 | 0.000 |
| Li EXTRACTION AMOUNT AFTER ACCELERATED TEST A (ppb/disk) | 21.0 | 19.0 | 33.0 | 49.0 | 17.0 | 16.0 |
| Si AMOUNT ELUTED IN ELUTION TEST S (ppb/disk) | 542 | 1013 | 1056 | 1162 | 277 | 135 |
| GLASS TRANSITION TEMPERATURE Tg(° C.) | 547 | 532 | 530 | 530 | 488 | 510 |
| YOUNG'S MODULUS E (GPa) | 95.5 | 92.4 | 88.5 | 90.7 | 79.8 | 82.3 |
| SPECIFIC GRAVITY ρ (DENSITY g/Cm³) | 2.72 | 2.70 | 2.64 | 2.66 | 2.43 | 2.47 |

TABLE 9-continued

| COMPONENT | COMPARATIVE EXAMPLE A wt % | COMPARATIVE EXAMPLE B wt % | COMPARATIVE EXAMPLE C wt % | COMPARATIVE EXAMPLE D wt % | COMPARATIVE EXAMPLE E wt % | COMPARATIVE EXAMPLE F wt % |
|---|---|---|---|---|---|---|
| SPECIFIC ELASTIC MODULUS E/ρ | 35.1 | 34.2 | 33.6 | 34.1 | 32.9 | 33.3 |
| VICKERS HARDNESS Hv | 688 | 664 | 666 | 647 | 554 | 589 |
| COEFFICIENT OF THERMAL EXPANSIONα (25-100) | 72.1 | 71.7 | 69.3 | 70.1 | 85.1 | 65.1 |
| HEAT CONDUCTIVITY (W/(m · K)) | 1.22 | 0.98 | 1.09 | 1.00 | 1.22 | 1.07 |
| MEDIUM ERROR COUNT :RELIABILITY TEST | 256 | 128 | 503 | 1099 | 133 | 198 |

As apparent from Tables 1 to 9, the Li elution amount A of Examples 1 to 40 was 15 ppb/2.5-inch disk or less, more specifically 13.1 ppb/2.5-inch disk or less and the count of signal errors of the information recording medium obtained therefrom was 100 or less, more specifically 89 or less. More preferably, the Li elution amount A is 6 ppb/2.5-inch disk or less. When the Li elution amount A is 4.6 ppb/2.5-inch disk or less, the information recording medium showed the count of signal errors of 28 or less, which was excellent. On the other hand, the Li elution amount A of Comparative Examples A to F was 16.0 ppb/2.5-inch disk or more and the count of signal errors of the information recording medium obtained therefrom was 128 or more.

The glass transition point (glass transition temperature) Tg of Examples 1 to 40 was in the range of 550° C. to 650° C., more specifically in the range of 563° C. to 631° C., while that of Comparative Examples A to F was 510° C. or less. Thus, it is found that the diffusion of alkaline ions is suppressed in the glass substrate for an information recording medium when the glass transition point Tg is 550° C. or more.

Examples 1 to 40 in which the Li elution amount A is reduced and the diffusion of alkaline ions is suppressed had the Si elution amount S in the range of at least 20 to 300 ppb/2.5-inch disk, more specifically in the range of 21 to 289 ppb/2.5-inch disk; the Young's modulus E in the range of 82 to 88, more specifically 82.0 to 87.9; the specific elastic modulus E/ρ of at least 31 or more, more specifically 32.4 or more; the Vickers hardness Hv in the range of at least 550 to 650, more specifically in the range of 589 to 632; the coefficient of thermal expansion a from 25° C. to 100° C. in the range of $45 \times 10^{-7}$ to $75 \times 10^{-7}$/° C., more specifically $67.2 \times 10^{-7}$/° C. or less; and the heat conductivity β in the range of at least 1.0 to 1.8 W/(mK), more specifically in the range of 1.05 to 1.25 W/(mK).

In summary, it is apparent that the glass substrates for an information recording medium of the present invention satisfy the requirements of the invention, so that they can further improve long term reliability of information recording media.

The present invention has been appropriately and sufficiently described hereinabove by way of embodiments by referring to the FIGURE in order to depict the present invention. It should be recognized that a person skilled in the art can easily modify and/or improve the above embodiments. Therefore, it is understood that such modifications or improvements carried out by a person skilled in the art are encompassed within the scope of the claims unless the modifications or improvements depart the scope of the claims.

As described above, the present specification discloses the techniques of various embodiments. Main techniques among these are summarized hereinafter.

The present invention is directed to a glass substrate for an information recording medium characterized in that it contains the following glass components in % by weight:
$SiO_2$: 52 to 67%;
$Al_2O_3$: 8 to 20%;
$B_2O_3$: 0 to 6% (including zero);
(wherein FMO=$SiO_2$+$Al_2O_3$+$B_2O_3$=70 to 85%);
$Li_2O$: 0.5 to 4%;
$Na_2O$: 1 to 8%;
$K_2O$: 0 to 5% (including zero);
(wherein R2O=$Li_2O$+$Na_2O$+$K_2O$=5 to 15%);
MgO: 2 to 9%;
CaO: 0.1 to 5%;
BaO: 0 to 3% (including zero);
SrO: 0 to 3% (including zero);
ZnO: 0 to 5% (including zero);
(wherein MgO+CaO+BaO+SrO+ZnO=5 to 15%);
$Y_2O_3$: 0 to 4% (including zero);
$La_2O_3$: 0 to 4% (including zero);
$Gd_2O_3$: 0 to 4% (including zero);
$CeO_2$: 0 to 4% (including zero);
$TiO_2$: 1 to 7%;
$HfO_2$: 0 to 2% (including zero);
$ZrO_2$: 0 to 5% (including zero);
$Nb_2O_5$: 0.2 to 5%; and
$Ta_2O_5$: 0 to 5% (including zero); and
it satisfies the following composition relation formulas (1) to (4):

$$Li_2O/R2O: 0.05 \text{ to } 0.35 \tag{1},$$

$$Li_2O/FMO: 0.005 \text{ to } 0.035 \tag{2},$$

$$Li_2O/(MgO+ZnO): \text{less than } 2 \tag{3 and}$$

$$Nb_2O_5/SiO_2: 0.01 \text{ to } 0.075 \tag{4}.$$

In another aspect, in view of improving impact resistance and reliability, the glass substrate for an information recording medium preferably has Young's modulus E of 82 GPa or more and less than 90 GPa; specific elastic modulus E/ρ of 31 or more, wherein ρ is specific gravity; Vickers hardness Hv of 550 to 650; Li extraction amount measured A after a predetermined accelerated test of 6 ppb or less per 2.5-inch disk; and Si amount eluted in a predetermined elution test of less than 300 ppb per 2.5-inch disk.

In another aspect, in view of improving reliability and preventing reduction in productivity, the glass substrate for an information recording medium preferably has glass transition point Tg of 550° C. or more and less than 650° C.

In another aspect, in view of improving reliability, the glass substrate for an information recording medium preferably has a coefficient of thermal expansion α of $45 \times 10^{-7}$ to $75 \times 10^{-7}$/° C.

In another aspect, in view of improving reliability, the glass substrate for an information recording medium preferably exhibits substantially uniform stress state on a main surface thereof.

In another aspect, in view of preventing deterioration in properties of a recording layer, the glass substrate for an information recording medium preferably has heat conductivity β of 1 to 1.8 W/(mK).

This application is based on Japanese Patent Application No. 2010-148571 filed on Jun. 30, 2010, the content of which is incorporated herein.

The present invention has been appropriately and sufficiently described hereinabove by way of embodiments by referring to the figures in order to depict the present invention. It should be recognized that a person skilled in the art can easily modify and/or improve the above embodiments. Therefore, it is understood that such modifications or improvements carried out by a person skilled in the art are encompassed within the scope of the claims unless the modifications or improvements depart the scope of the claims.

INDUSTRIAL APPLICABILITY

According to the present invention, it is possible to prevent the reduction in the recycle number of times of silica-based abrasive grains upon fine polishing of a glass plate containing cerium oxide and to obtain a glass substrate for an information-recording medium having a preferable flatness.

The invention claimed is:

1. A glass substrate for an information recording medium, comprising the following glass components in % by weight:
$SiO_2$: 52 to 67%;
$Al_2O_3$: 8 to 20%;
$B_2O_3$: 0 to 6% (including zero);
(wherein FMO=$SiO_2$+$Al_2O_3$+$B_2O_3$=70 to 85%);
$Li_2O$: 0.5 to 4%;
$Na_2O$: 1 to 8%;
$K_2O$: 0 to 5% (including zero);
(wherein R2O=$Li_2O$+$Na_2O$+$K_2O$=5 to 15%);
MgO: 2 to 9%;
CaO: 0.1 to 5%;
BaO: 0 to 3% (including zero);
SrO: 0 to 3% (including zero);
ZnO: 0 to 5% (including zero);
(wherein MgO+CaO+BaO+SrO+ZnO=5 to 15%);
$Y_2O_3$: 0 to 4% (including zero);
$La_2O_3$: 0 to 4% (including zero);
$Gd_2O_3$: 0 to 4% (including zero);
$CeO_2$: 0 to 4% (including zero);
$TiO_2$: 1 to 7%;
$HfO_2$: 0 to 2% (including zero);
$ZrO_2$: 0 to 5% (including zero);
$Nb_2O_5$: 0.2 to 5%; and
$Ta_2O_5$: 0 to 5% (including zero); and
satisfying the following composition relation formulas (1) to (4):

$$Li_2O/R2O:0.05 \text{ to } 0.35 \quad (1),$$

$$Li_2O/FMO:0.005 \text{ to } 0.035 \quad (2),$$

$$Li_2O/(MgO+ZnO):\text{less than } 2 \quad (3) \text{ and}$$

$$Nb_2O_5/SiO_2:0.01 \text{ to } 0.075 \quad (4).$$

2. The glass substrate for an information recording medium according to claim 1, exhibiting
Young's modulus E of 82 GPa or more and less than 90 GPa;
specific elastic modulus E/ρ of 31 or more when ρ is specific gravity;
Vickers hardness Hv of 550 to 650;
Li extraction amount A measured after a predetermined accelerated test, of 6 ppb or less per 2.5-inch disk; and
Si amount eluted in a predetermined elution test of 300 ppb or less per 2.5-inch disk.

3. The glass substrate for an information recording medium according to claim 1, exhibiting glass transition point Tg of 550° C. or more and less than 650° C.

4. The glass substrate for an information recording medium according to claim 1, exhibiting a coefficient of thermal expansion a of $45\times10^{-7}$ to $75\times10^{-7}$/° C.

5. The glass substrate for an information recording medium according to claim 1, exhibiting substantially uniform stress state on a main surface thereof.

6. The glass substrate for an information recording medium according to claim 1, exhibiting heat conductivity β of 1 to 1.8 W/(mK).

7. The glass substrate for an information recording medium according to claim 1, the content of $Li_2O$ is 0.8 to 3.5% by weight.

8. The glass substrate for an information recording medium according to claim 1, wherein the glass substrate exhibits long term reliability.

* * * * *